METHOD AND APPARATUS FOR WINDING YARN
Original Filed April 5, 1965 6 Sheets-Sheet 2
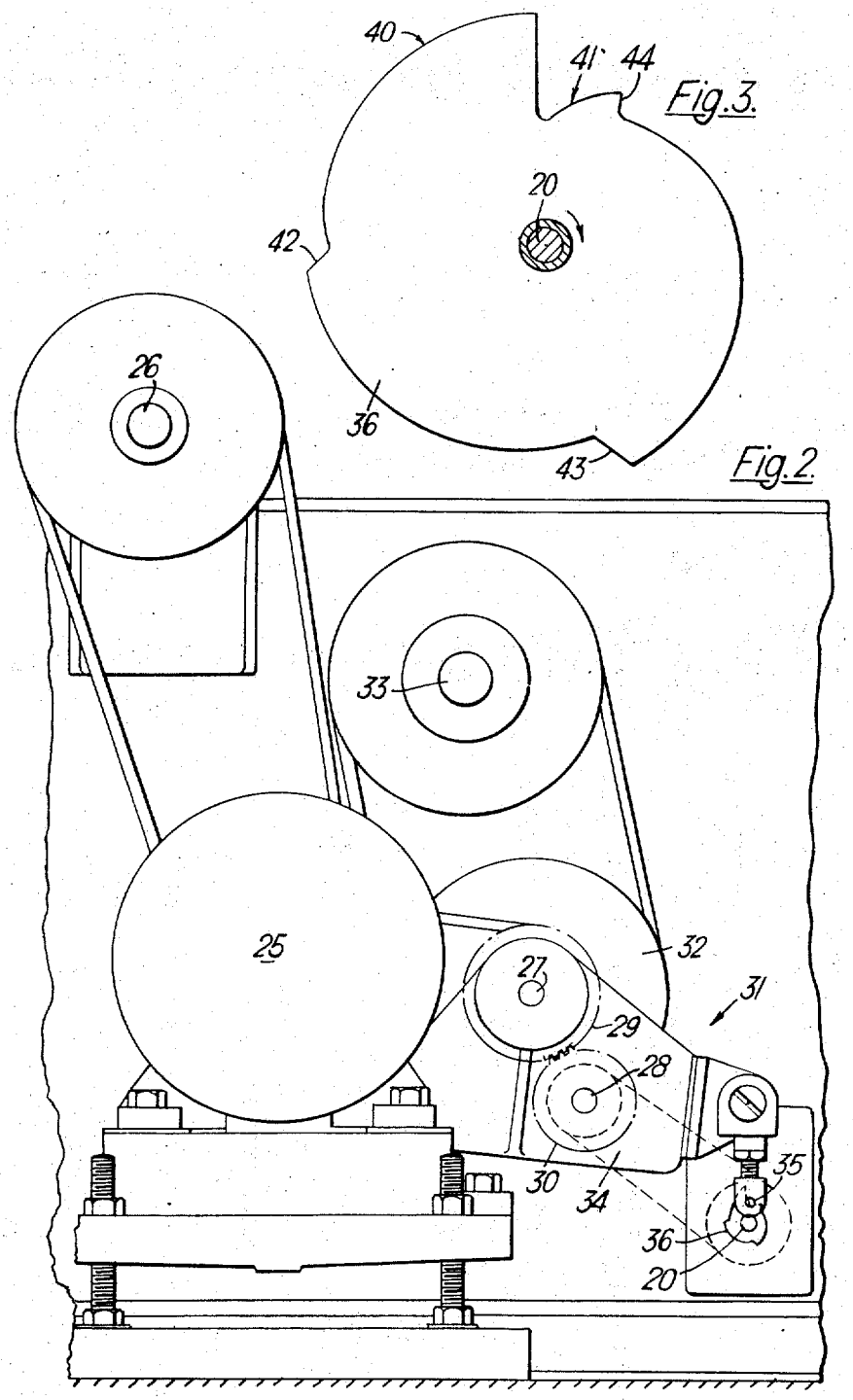

METHOD AND APPARATUS FOR WINDING YARN

Original Filed April 5, 1965 6 Sheets-Sheet 5

METHOD AND APPARATUS FOR WINDING YARN

Original Filed April 5, 1965 6 Sheets-Sheet 6

United States Patent Office

Re. 27,497
Reissued Oct. 3, 1972

27,497

METHOD AND APPARATUS FOR WINDING YARN

Bryan Kingsley Johnson, Abergavenny, and Frederick Arthur Smith, Newport, England, assignors to British Nylon Spinners Limited, Pontypool, Monmouthshire, England Original No. 3,488,938, dated Jan. 13, 1970, Ser. No. 442,858, Apr. 5, 1965. Application for reissue Apr. 22, 1970, Ser. No. 30,727
Int. Cl. D01h *13/00;* D02g *3/02*
U.S. Cl. 57—98 19 Claims

Matter enclosed in heavy brackets [ ] appears in the original patent but forms no part of this reissue specification; matter printed in italics indicates the additions made by reissue.

ABSTRACT OF THE DISCLOSURE

An apparatus and process for the preparation of cylindrically-wound yarn packages characterized by a relatively high helix angle and reduced ridging, the process including programming means arranged to control the winding conditions by varying winding speeds in a manner such as to reduced ridging.

Figure 4:
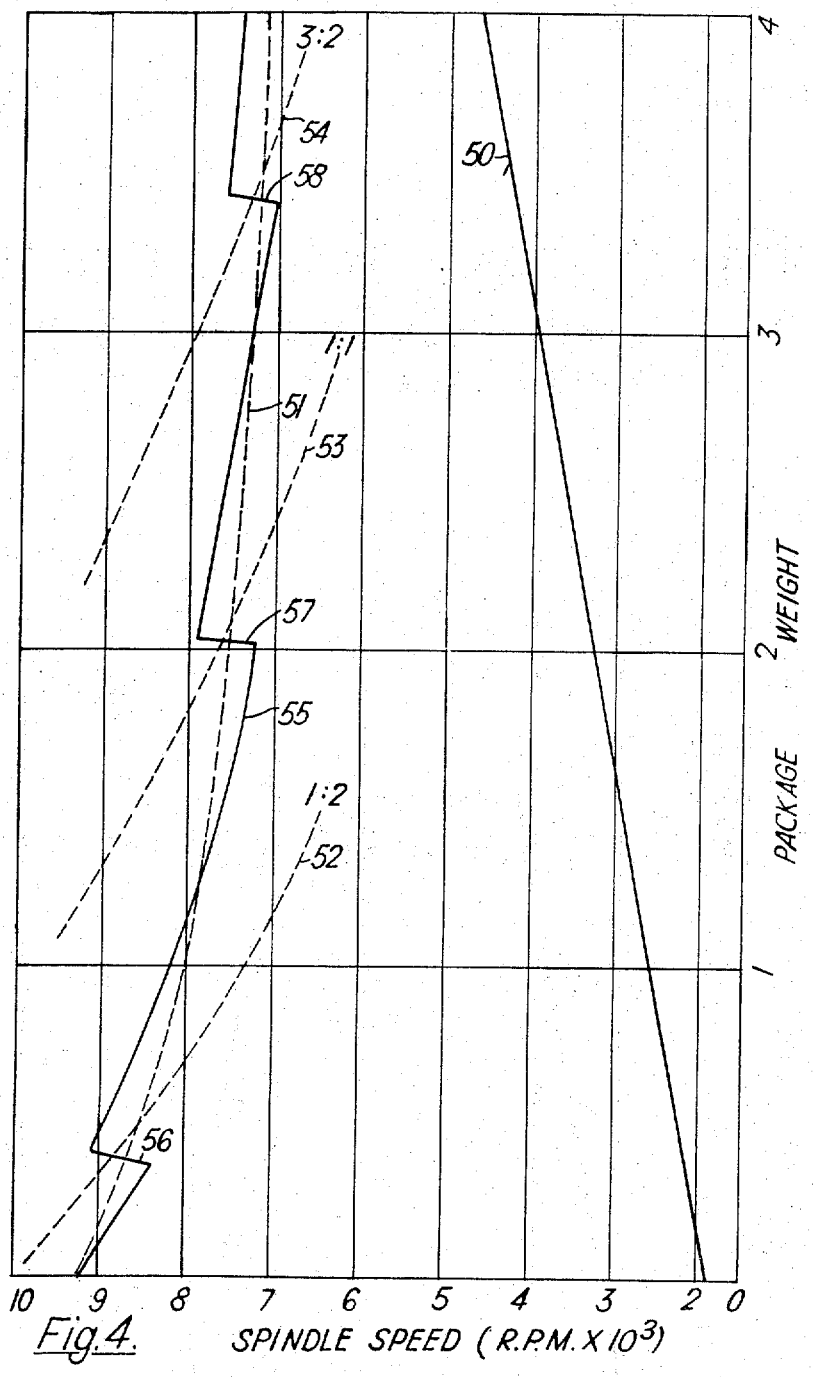

This invention relates to a method and apparatus for winding yarn in the form of "cylindrical-wound" packages, in which the yarn is laid with a "relatively high helix angle," and associated therewith is drive means including means by which the speed of the spindles on which the packages are being formed is variable during the winding of the packages.

The term "cylindrically-wound package" used above refers to packages in which at least a part of each layer of yarn is wound so as to form part of a cylindrical portion of the package (although not necessarily a "right cylinder"). Thus, the packages may be wholly of cylindrical form i.e. cheeses, or be of other forms of build, such as conical-ended packages of, for example, pirn or "long-to-short" build.

Further, for convenience, in this specification, the chuck or spindle upon which the package container is clamped during the winding operation will be referred to as a "spindle," irrespective of whether a wholly cylindrical package or a conically-ended package is formed thereon.

The term "helix angle" is used in this specification to refer to the maximum angle of inclination of the curve representing the developed view of the lay of the yarn on the package, to the mean axis of this curve, and a "relatively high" value of this angle is an angle in excess of 1°, although it may vary throughout the winding of a package.

The kinds of winding apparatus to which the present invention applies are as follows:

(a) Apparatus for the formation of wholly cylindrical packages, hereinafter for convenience referred to as "cheeses," having a rotating spindle and reciprocating traverse yarn guide means, the spindle speed being proportional to the ratio of the yarn delivery speed to the package diameter while the traverse guide speed is variable, independently of the spindle speed, at will (as compared to winding arrangements in which the spindle and yarn traverse guide means are driven by common driven means, and at speeds which are not independently variable, except by an interruption of the driving of one or both parts).

There are predictable points during the winding operation of either form of such winding apparatus, when the number of spindle revolutions per traverse cycle of the yarn guide is either a small integer or a ratio of small integers at these points, hereinafter referred to as "wind ratios," these wind ratios corresponding to periods during the winding operation when the yarn in one layer of the package is laid directly on the yarn of layers laid immediately previously, at these "wind ratios" this "synchronisation" of the winding causing ridges of yarn to be produced within the package structure.

It will be understood that, in such a winding arrangement, the winding conditions at any particular package diameter, comprise the spindle speed, traverse yarn guide speed and the yarn delivery speed.

(b) Apparatus for winding, say, a conically-ended package, having a driven spindle and over-end yarn guide means, for example, a ring and traveller guide device, the yarn being laid on the package in the form of closely wound helical turns with a sinusoidal wave-form superimposed thereon, due to, say, the axis of the ring of a ring and traveller yarn guide device being inclined to the spindle axis.

For convenience hereinafter such packages produced by over-end winding apparatus will be referred to as "conically-ended" package.

The winding apparatus will be assumed to include a ring and traveller yarn guide device, although other forms of over-end winding such as cap-spinning would also be applicable as they usually have tapered end portions.

In such a case, on either side of certain predictable points in the winding operation, parts of the sinusoidal curves of yarn merge together to produce a fine patterned effect in the surface relief of the package.

The winding conditions associated with such a winding arrangement, and at any particular package diameter, comprise the spindle speed, the winding-on speed of the yarn, the traveller speed, the type of build of the package and the angle of inclination of the axis of the ring to the spindle axis.

For any over-end winding arrangement for producing conically-ended packages it is possible to derive the following equation:

$$S=T+W$$

in which S is the spindle rotational speed, T is the rotational speed of the traveller (in the requisite units), and W is the fraction of the spindle rotational speed corresponding to the winding-on of the yarn.

The winding speed W of the yarn is equivalent to the package rotational speed in the case of the cheese winding operation referred to above, and would be equal in magnitude to the spindle rotational speed if the traveller was stationery (i.e. T=D).

The points associated with the patterning, on the package in the winding of conically-ended packages correspond to the "wind ratios" of the cheese winding arrangement, and are when the ratio of T:W is either a small integer or a ratio of small integers.

These ratios also may be called "wind ratios," and are equivalent to the "wind ratios" referred to above with respect to the formation of cheeses, although the manner of formation of ridges on cheeses differs from that of the patterning on the concially-ended packages, and both the problem of the reduction of ridging and the reduction of patterning may be solved in equivalent ways.

The present invention is especially concerned with over-end winding apparatus in which it is possible to control the value of S at will, and either consequently, or otherwise, to control some such aspect of the winding operation throughout the production of a conically-ended package.

The value of the term T may be varied at will, or be maintained at a constant value, by appropriate changes in the value of S (the value of W varying so that the relations S=T+W is obeyed). Thus, the winding condiapplies[,]) to associate the most enhanced periods of such ridging with predetermined ratios of the reciprocating traverse yarn guide speed and the winding-on speed.

In these prior arrangements, the normal winding operation has been interrupted in a cyclic manner, by imposing a periodic variation on the winding-on speed continuously throughout the winding of a package, perhaps by applying a brake, or by causing the package to slip relatively to the traverse drum or drive roll.

It is an object of the present invention to provide winding apparatus including means to enable the winding operation to be programmed, and so to cause the patterning or ridging within a package to be reduced to negligible proportions, by eliminating, or at least reducing the extent of the occurrence of those wind ratios corresponding to the most enhanced patterning or ridging in the winding operation.

As stated above, the periods of most enhanced patterning on conically-ended packages, and of ridging on cheeses, occur at predictable points in the winding operation, these points being when the "wind ratio" is either a small integer or a ratio of small integers. In both cases, these points are associated with certain package diameters, the values of these diameters being calculable from a knowledge of the winding conditions pertaining to the formation of the package.

The wind ratios which correspond to the most enhanced patterning on conically-ended packages are as follows, given in an approximately order of decreasing magnitude of the effects:

1:1; 2:1; 3:1; 1:2; 3:2 and 5:2; 1:3; 2:3; 4:3; 5:3; 7:3 and 8:3; etc.

It will be appreciated that the numerical value of the wind ratio increases progressively as the package is being formed.

The above list is composed as a result of making the assumption, which will generally be true for conically-ended packages, that of the possible ratios, the integers 4:1 and above; and the simple fractions 7:2 and other multiples of 1:2; 10:3 and other multiples of 1:3 etc. will not occur in the winding of the package.

In order to reduce patterning to negligible proportions, the patterning associated with any of the wind ratios listed above should be eliminated, or substantially reduced in the winding of a package, and possibly also the wind ratios which are multiples of 1:4 up to 11:4.

With respect to cheeses, the wind ratios which correspond to the most enhanced ridging and which will generally occur in the winding of the package are: the integers 2:1; 3:1; up to 8:1; and the ratios of small integers in between these values.

According to the present invention, winding apparatus for producing "cylindrically-wound" packages, in which the yarn is laid with a "relatively high helix angle," there being a predetermined point or points during the formation of such a package associated with a period or periods during which the package is patterned or ridged, each such period corresponding to winding conditions having associated therewith a "wind ratio" (as defined above) the numerical value of which is either a small integer or a ratio of small integers, includes programming means arranged to control the winding conditions and to cause an increase in the numerical value of the wind ratio at the predetermined point or points in the winding operation, so as to reduce the extent of the period or periods of enhanced patterning or ridging in the formation of the package.

It will be appreciated that if a period of patterning or ridging is to be traversed effectively this could be in a manner which either caused the numerical value of the wind ratio to be either increased or decreased. However, if the value of the wind ratio is decreased, perhaps by a form of scrambling device, then the period of patterning or ridging associated therewith will have to be traversed again as the formation of the package continues, by causing the value of the wind ratio to increase. Hence if the value of the wind ratio is increased as each predetermined period of enhanced patterning or ridging is approached, then the periods will only have to be traversed once in each winding cycle.

Hence, over-endwinding apparatus for producing "conically-ended" packages on a spindle in which package the yarn is laid with a "relatively high helix angle," has programming means arranged to increase the speed of the spindle at the predetermined point or points in the winding operation, so as to reduce the extent of the period or periods of enhanced patterning in the formation of the package.

In one construction, the programming means for the spindle drive means includes a profiled cam arranged to make one revolution between the winding of successive packages, and embodying the desired spindle speed programme, the cam controlling the spindle speed in such a manner that at the selected points during the winding of each package this speed is increased.

Conveniently, the programming means comprises an electrical device and includes a potentiometer, position of the slides of this potentiometer being controlled by the cam, and the output signal from the programming means controlling the output of a synchronous electric motor driving the spindle on which the package is formed, this motor only driving the spindle.

In addition, winding apparatus for producing cheeses having a rotating spindle, the rotational speed of the spindle being arranged to be proportional to the ratio of the yarn delivery speed to the package diameter, and reciprocating traverse yarn guide means the speed of which is variable independently of the spindle speed at will, and in which package the yarn is caused to be laid with a "relatively high helix angle," has programming means arranged to decrease the speed of the traverse yarn guide at the predetermined point or points in the winding operation, so as to reduce the extent of the period and periods of enhanced ridging in the formation of the package.

According to another aspect, the present invention resides in a method of producing "cylindrically wound" packages, in which the yarn is laid with a "relatively high helix angle," there being a predetermined point or points during the formation of each such package associated with a period or periods during which the package is patterned or ridged, each such period corresponding to winding conditions having associated therewith a wind ratio (as defined above) the numerical value of which is either a small integer or a ratio of small integers, comprises controlling the winding conditions to cause an increase in the numerical value of the wind ratio at the predetermined point or points in the winding operation, so as to reduce the extend of the period or periods of enhanced patterning or ridging in the formation of the package.

In one form, in a method for producing a "conically-ended" package on a spindle by over-end winding, and in which package the yarn is laid with a "relatively high helix angle," the speed of the spindle is increased at the predetermined point or points in the winding operation so as to reduce the extent of the period or periods of enhanced patterning in the formation of the package.

In one method of winding conically-ended packages (particularly of the so-called "long-to-short" build), the spindle speed is arranged to be reduced throughout the winding of each package, except at the predetermined point or points, when the spindle speed is increased.

The programme of the spindle speed may be such that optimum winding conditions are adopted where two features included in the programme are mutually inconsistant, the first feature being related to controlling the spindle speed so that this speed is increased at the predetermined point or points, and the second feature being related, say, o controlling the spindle speed so that this speed is reduced in a manner tending to maintain a constant value for the balloon tension of the yarn throughout the winding operation.

The allowable increase in spindle speed at any point in he winding operation will be limited, so that the winding-on tension in the yarn is not increased beyond an unacceptable level, or the change in winding-on tension is not so great as to render the properties of the yarn wound under this higher tension markedly different from the properties of adjacent layers of yarn, i.e. such that it will be recognisable as streaks in the fabric into which the yarn is made-up.

However, a change in spindle speed from a value 10% below the normally-desired value at each predetermined point in the winding operation, to a value 10% above his normally-desired value at each predetermined point, will generally have no recognisable adverse effects on the yarn or the fabric into which the yarn is made.

The increase in spindle speed at each predetermined point, and embodied in the spindle speed programme, may be arranged to be the minimum requisite value in order o reduce substantially the patterning at that point in the winding operation, the value of the increase varying between different predetermined points.

In one arrangement the requisite increase in spindle speed at each predetermined point in the winding operation is arranged to be effected during a period less than 0.5% of the package winding period.

Alternatively, in a method of winding cheeses on a spindle in which the rotational speed of the spindle is arranged to be proportional to the ratio of the yarn delivery speed to the package diameter, and the speed of a reciprocating traverse yarn guide is arranged to be independently variable of the spindle speed at will, and in which cheese the yarn is laid with a "relatively high helix angle" the speed of the traverse yarn guide is decreased at the predetermined point or points in the winding operation, so as to reduce the extent of the period or periods of enhanced ridging in the formation of the package.

Figure 5A:
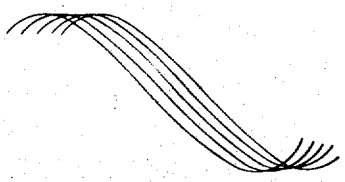
Figure 5B:
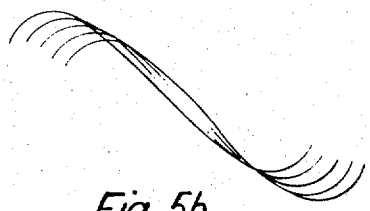
Figure 1:
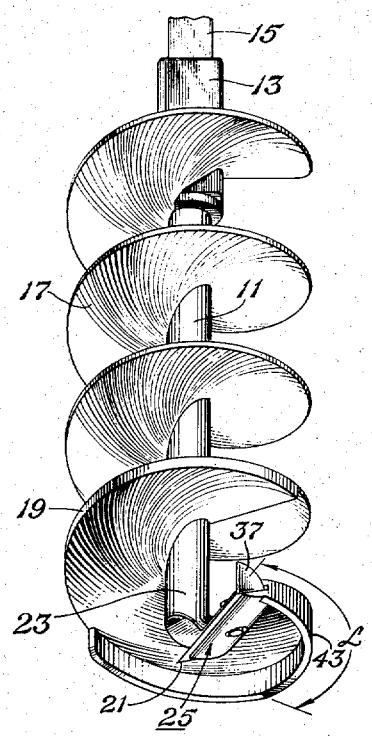
Figure 3:
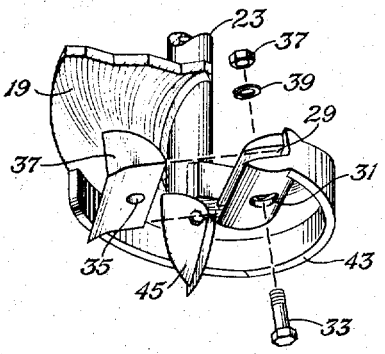
Figure 2:
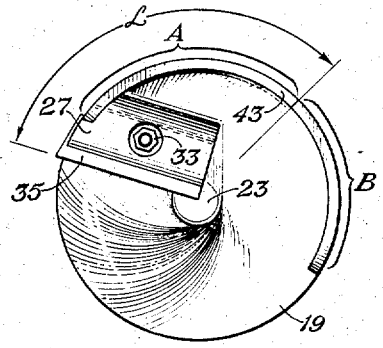
Figure 4:
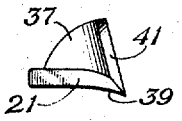

Two embodiments according to the present invention and a modification thereof, will now be described by way of example, but not limitation, thereof, and with reference o the accompanying drawings, in which FIG. 1 is a diagrammatic representation of a draw twist machine for producing conically-ended packages by over-end winding, FIG. 2 shows one form of drive means for the machine of FIG. 1, FIG. 3 illustrates the cam used to control the spindle speed of this machine, FIG. 4 is a graph of the spindle speed programme throughout the winding of a package, when the winding apparatus is controlled by the cam of FIG. 3, FIG. 5a shows the lay of the yarn on a conically-ended package produced by the apparatus of FIG. 1, when in a pattern-free condition, FIG. 5b shows the lay of the yarn on a package in a pattern-forming condition.

Figure 5C:
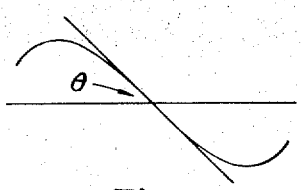
Figure 8A:
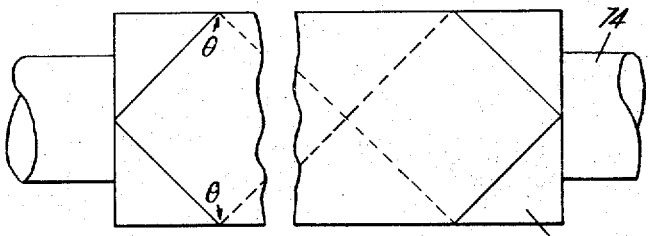
Figure 8B:
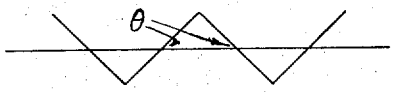
Figure 6:
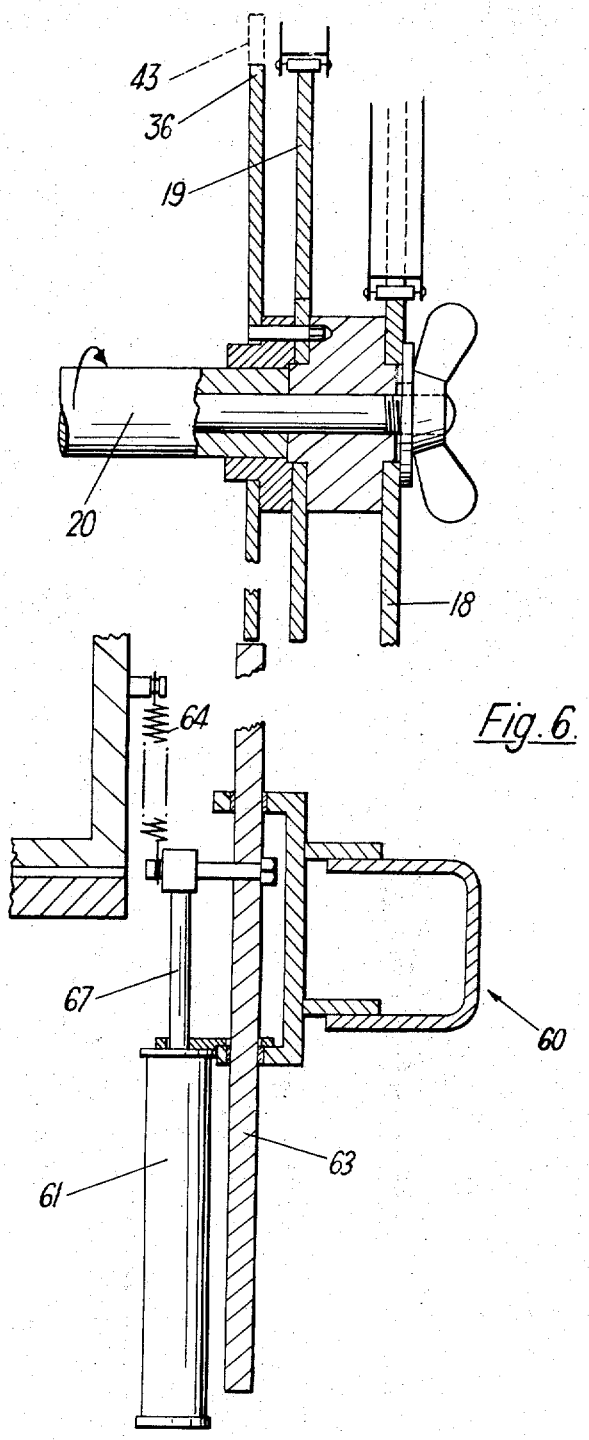
Figure 7:
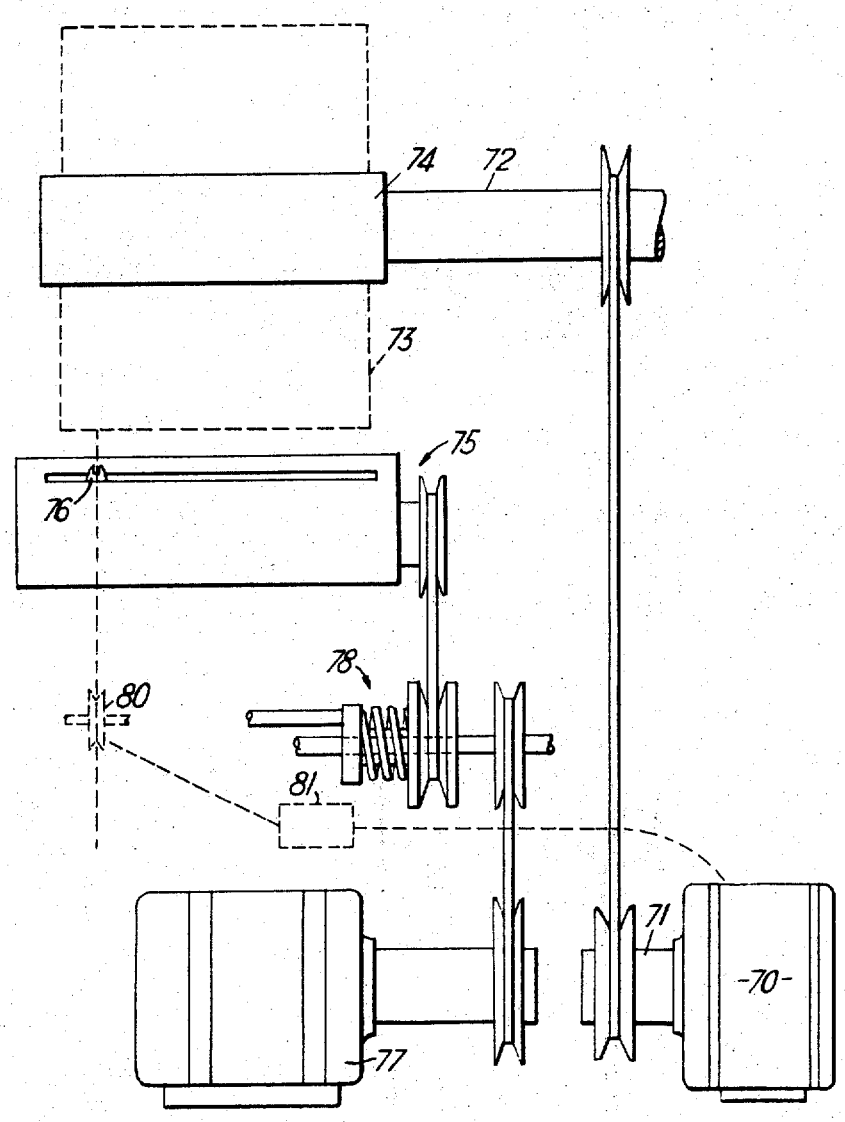

FIG. 5c is a developed view of the lay of the package and indicates the "helix angle" ($\theta$) associated with such a yarn package, FIG. 6 is a cross-sectional view of a modified form of control device for the spindle drive means of the machine shown in FIG. 1, FIG. 7 shows diagrammatically a cheese winding arrangement according to the present invention in which he traverse yarn guide is oscillated at a speed varying according to a predetermined programme, FIG. 8a shows, in an exaggerated manner, the lay of yarn on a cheese during a ridge-forming condition of the winding apparatus of FIG. 7, and FIG. 8b is a developed view of the lay of the yarn of the cheese, and indicating the "helix angle" ($\theta$) associated therewith, this angle in practice being of the order of 1°.

The apparatus shown in FIG. 1 comprises a draw-twist machine for drawing a yarn made of a synthetic polymer, for example, a polyamide, and for collecting the drawn yarn in the form of a conically-ended package by means of over-end winding.

The yarn 1 is withdrawn from a cheese 2 mounted on a container 3, and passes through yarn guide means, indicated at 4, to a pair of co-operating feed ralls 5 and 6. From these feed rolls the yarn is wrapped around an inclined snubbing pin 7, which causes a considerable physical restraint to be imposed on the yarn, resulting in the yarn "necking" and being stretched to, say, five times its original length. The yarn then passes around draw rolls 8 and 9, which forward the yarn at a speed five times greater than it is forwarded by the feed rolls 5 and 6.

After the draw rolls 8 and 9, the yarn passes through a balloon guide 10 to the winding apparatus, where it is wound onto a package 11 rotatably mounted on a vertically extending spindle 12. The yarn guide means, causing the yarn to be laid on the package, comprises a conventional ring and traveller device 13 mounted on a ring rail 14, this ring rail 14 being reciprocated along the spindle axis by a known form of builder mechanism, including a striker plate 15 secured to the ring rail 14 for recprication therewith. At each end of each reciprocation stroke the plate 15 is arranged to operate a microswitch 16 or 17, and so causing the reversal of the direction of movement of the ring rail. The positions of the micro-switches 16 and 17 are controlled respectively by two cams 18 and 19, rotatably mounted on a shaft 20 driven at a constant speed.

In the embodiment illustrated in FIG. 1, the builder mechanism is adjusted so that a "long-to-short" package is produced, the distance between the micro-switches, and consequently the stroke length of the reciprocation of the ring rail 14 along the package axis, continuously decreasing throughout the winding operation, the cams 18 and 19 rotating through 330° during the winding of each package.

In order to improve the stability of the package, the axis of the ring of the ring and traveller yarn guide device 13 is inclined at an angle of 3° to the axis of the spindle 12. Thus, the yarn is laid on the package in the form of closely-wound helical turns on which is superimposed a sinusoidal wave-form due to the inclination of the ring causing the traveller to have a small amplitude oscillating movement along the spindle axis. This sinusoidal component of the lay of the yarn on the package, causes the yarn to interlock, and so is less liable to sloughing, but does cause the yarn to form a surface relief pattern on the package at certain diameters as the package is being formed.

FIG. 2 shows a convenient form of drive means for the draw-twist machine illustrated in FIG. 1. This drive means comprises a synchronous electric motor 25 driving a shaft 26 at a constant speed, this shaft being coupled to the feed rolls 6 and 7, and the draw rolls 8 and 9 of the machine. A second constant speed shaft 27 also is driven by the motor 25, and in turn drives a third constant speed shaft 28, through co-operating pinions 29 and 30.

The shaft 27 is coupled to a variable pitch pulley 32, and the spindle 12 is driven by the motor 25, through this variable speed device 32, shaft 33, and the shaft 27. The pitch of the pulley 32, and consequently the spindle speed, is controlled by the position of a lever 34 coupled to the variable pitch pulley 32. This lever 34 carries a cam follower 35 arranged to engage a cam 36 (shown in FIG. 3, but not shown in FIG. 2), this cam 36 being rotatably mounted on the arm shaft 20, which is driven at a constant speed from the shaft 28.

Thus, the spindle speed is varied throughout the winding of a package in accordance to the profile of the cam 36, the spindle 12 being driven by the motor 25 via the variable speed device 32, which is controlled by the cam 36 through the cam follower 35 and lever 34.

The cam profile, which embodies the spindle speed programme throughout the winding of each package incorporates the features that the spindle speed reduces throughout the winding of each package, except at those points in the winding operation at which enhanced patterning of the package surface occurs these points corresponding to certain predictable package diameters. This feature of the spindle speed programme, being illustrative of the present invention, will be referred to in detail below, with reference to the data presented in the form of the graph comprising FIG. 4.

The cam 36, illustrated in FIG. 3, causes the spindle speed to be reduced from its initial high value, at 40 on the cam profile, to its final, relatively low value at 41. There are three intermediate points 42, 43, and 44, which comprise protrusions on the generally-reducing radii of the cam, these points corresponding to points in the spindle speed programme at which the spindle speed is relatively sharply increased (but not instantaneously increased).

With respect to the feature of the winding programme, that the spindle speed should be reduced during the winding of each package, of the possible types of build for conically-ended packages, with which the present invention is concerned, the long-to-short build, in which the ring rail has a continuously reducing reciprocating stroke length throughout the winding operation, is particularly advantageous when a reducing-spindle-speed programme is desired, as in this case the maximum productivity is possible from the winding apparatus.

With respect to the other conically-ended package builds limitations in speed are necessary as the package grows, due to the possibility of excessive torque being applied to the spindle, or the traveller of a ring and traveller yarn guide device exceeds its maximum desirable speed and is subjected to excessive wear.

The advantages are to be obtained if the spindle speed is reduced during the winding of a package are illustrated in the following example.

EXAMPLE

A constant-spindle-speed device has a maximum acceptable rotational speed for a full package of 4.5 inches diameter on a 2 inches diameter container of 5000 r.p.m. If the device has a constant yarn delivery speed of 1,330 feet per minute, the traveller speed increases from 3,000 r.p.m. to 5,080 r.p.m. during the winding of the package.

The spindle-speed of the reducing spindle-speed apparatus, winding an equivalent package may start at 8,630 r.p.m. the yarn delivery speed being constant throughout the winding operation at 3,200 feet per minute, and the traveller speed being constant at 3,000 r.p.m.

Thus, winding apparatus with a reducing-spindle-speed device has increased productivity by 10% over winding apparatus employing a constant spindle-speed throughout. Further, the traveller speed has been reduced by a maximum value of 41% and so reduced the possible stress within this part of the apparatus.

Further, the long-to-short package build, referred to above, also enables the balloon tension yarn and hence the yarn take-off tension to be controlled, is controlled, the balloon tension of the yarn being maintained substantially at a constant value throughout the winding operation if the spindle speed is arranged so that the square of the traveller speed is proportional to the package diameter as the package is being formed. Thus, the winding apparatus having a reducing-spindle-speed device may be programmed to achieve this desired object.

The graph shown in FIG. 4 indicates a suitable spindle-speed programme, for the production of a "long-to-short" conically-ended package of 70 denier multifilament yarn having 34 constituent filaments, the yarn being delivered at 1740 feet per minute. The graph is of spindle speed against package weight (this latter co-ordinate being converted to package diameter, as indicated by the axis 50), for a package of a particular overall length.

On this graph, the chain line 51 indicates how the spindle speed should be reduced in order to obtain a constant value of the balloon-tension of the yarn on the package throughout the winding operation, this value being 8 grams, or approximately the desired minimum value for maintaining a stable balloon, namely 0.1 gram per denier. As can be seen from FIG. 4, in such a case the spindle speed decreases gradually throughout the formation of the package from an initial value of 9,200 r.p.m. to 7,200 r.p.m.

Superimposed on this curve 51 are three curves 52, 53 and 54, respectively, representing the three periods at which the most enhanced patterning occurs during the formation of the package, i.e. corresponding to a wind ratio of 1:2, curve 52 to a wind ratio 1:1, curve 53; and to wind ratio of 3:2, being indicated by curve 54.

Each curve is given by the general formula $$S=\frac{Del}{\pi D}(I+P)$$

where

S is the spindle speed (r.p.m.)
Del is the yarn delivery speed (inch/minute),
D is the package diameter (inch), and
P is the numerical value of the wind ratio.
S=T+W, where T is the traveller speed (r.p.m.)

It will be appreciated that, although the curve corresponding to each wind ratio is represented by a line, in fact patterning will occur on either side of this line, and each line represents the mean of a patterning zone on the graph.

At the points of intersection between the curve 51 and the curves 52, 53, 54, then the package wound according to the spindle speed programme embodied in the curve 51 will have enhanced surface patterning.

Consequently, in order to eliminate this patterning, or at least to reduce the extent to which it occurs, a revised winding programme is chosen, this programme being represented by the line 55 on the graph and embodied in the cam 36.

As can be seen from FIG. 4, t his winding programme, and imposed by the can 36 of FIG. 3, initially, causes the yarn to be wound under the desired balloon tension of 8 grams, but gradually falls below this value, to a value of approximately 7 grams, when the first patterning zone is approached (corresponding to the wind ratio 1:2). The spindle speed is then relatively sharply increased by approximately 10%, indicated by the portion 56 of the line 55, causing the balloon tension to rise to 9 grams.

Thus, the patterning zone, is traversed quickly, compared to the winding programme embodied in the line 51 and say, during the laying of two layers of yarn on the package, for the surface relief pattern eflect to be observed.

The spindle speed is then caused to be gradually reduced, until the next patterning zone is encountered at 57 (corresponding to wind ratio 1:1). Intermediate between these two zones 56 and 57, the line 55 on the graph crosses the line 51 corresponding to the constant balloon-tension winding programme, the spindle speed being caused to be reduced at a greater rate than that required for this latter programme. Thus the value of the balloon tension will have dropped from 9 grams to 7 grams during this period.

The patterning zone corresponding to the wind ratio 1:1 is traversed in like manner to that described above with reference to the wind ratio 1:2. Again, the spindle speed is relatively sharply increased, by approximately 10% (although it may be necessary to have a greater increase in the spindle speed in order to eliminate patterning at this point 51 in the spindle speed programme 55). The balloon tension again rises to about 9 grams in value.

This procedure is repeated with respect to the patterning zone corresponding to the wind ratio 3:2, the spindle speed being gradually reduced after the point 57, until it is at a value approximately 5% below the corresponding value on the constant balloon tension curve 51, at the point 58, it then being sharply increased to 5% above, this value, and as the patterning zone is traversed, and patterning is not formed on the package surface at this point 58 in the spindle speed programme 55.

It will be appreciated that with the spindle speed programme 55 described above reducing the spindle speed throughout the winding operation, the intersection points 56, 57 and 58 between wind ratio curves 52, 53, 54 and the programme line 55 will occur at points corresponding to larger package diameters, compared to a programme requiring a substantially constant value for the spindle speed throughout the winding operation. Hence, it is relatively easier for the winding apparatus to be programmed so as to avoid the regions of enhanced patterning during the formation of packages.

During the winding of packages according to such a spindle speed programme 55, the rate of twist insertion in the yarn will fluctuate, but the overall value for this rate will vary only from approximately 0.25 t.p.i. at the initiation of the winding operation, to 0.17 t.p.i. at the outer layers of the package. Such a variation in the twist insertion rate will not be noticeable in the appearance of fabrics into which the yarn is made, particularly as the mean insertion rate is a low value, and hence the variations in the winding conditions embodied in this programme are normally acceptable.

To summarise, the steps taken in the preparation of a suitable spindle speed programme are as follows:

(1) Calculate the volume of the conically-ended package at various diameters, and plot a graph 50 of the diameter of the package against its weight, (2) Calculate the spindle speeds required, for any given yarn delivery speed; in order to give a constant balloon tension throughout the package at the various diameters, and a graph 51 of spindle speed against package diameter plotted for constant balloon tension is obtained, (2) The curves 52, 53, 54 associated with the wind ratios, corresponding to the periods of most enhanced patterning throughout the winding operation, are plotted at various spindle speeds and diameters, and are superimposed on the graph 51 prepared under paragaph 2, and the intesection points 56, 57, 58, respectively, are noted (4) Select a cam control device, and calculate the increase in package diameter per degree of angle of rotation of the cam, and (5) Design a cam to suit the planned programme, which conforms to a line 55, and which causes the spindle speed to be increased comparatively sharply at the points, 56, 57, 58, but consistent with the attainment of the second feature of the spindle speed programme, the line 55 conforms to the graph 51 as closely as possible, optimum values, for the spindle speed being embodied in the spindle speed programme 55 at the points 56, 57, 58.

The cam 36, shown in FIG. 3 has protrusions 42, 43, 44 respectively corresponding to the points 56, 57 and 58 on the spindle speed programme 55, the profile of the can embodying the programme 55.

Figure 5:
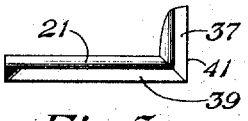
Figure 6:
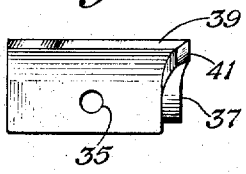

The appearance of the patterning on the surface of a conically-ended package and the manner of its formation is indicated in FIG. 5. As stated above, the yarn is laid on the package in the form of closely wound helical turns on which is superimposed a sinusoidal wave form, when the axis of the ring of the ring and traveller yarn guide device is inclined to the spindle axis. The maximum angle of the inclination of the curve representing the developed view of the lay of the yarn on the package, to the mean axis of this curve, is then defined as the "helix angle," and is the angle ($\theta$) indicated in FIG. 5c. When the value of this angle is relatively high, say, in excess of 1°, which it usually will be if the axis of the ring is intentionally tilted with respect to the spindle axis, then patterning of the package surface at certain package diameters occurs.

When each turn of yarn includes a small integral number of sinusoidal waves, i.e. the value for the wind ratio T:W being a small integer, or each turn of yarn has a number of sinusoidal waves which is a ratio of small integers, then the lay of adjacent turns of yarn is represented by FIG. 5a. However, immediately on either side of this point in the winding operation, the parts of the waves having the maximum angle of inclination to the mean axis of the lay of the yarn on the package, i.e. the parts of the waves defining the "helix angle" ($\theta$) shown in FIG. 5c merge together in the manner shown in FIG. 5b.

It will be appreciated that this merging of the turns of yarn causes ridges to be formed on the package surface, each ridge comprising only a small part of the length of each turn, and being inclined at an angle approximating to the "helix angle" ($\theta$) thereto. There may be more than one ridge associated with each turn of yarn, and in any event these ridges will be distributed over the package surface at this point in the winding operation, so that a fine surface relief pattern effect is obtained.

The yarn lay shown in FIG. 5a corresponds to, say, a wind ratio of 1:1, while the yarn lay shown in FIG. 5b corresponds to a wind ratio of, say, 1.001:1.

The numerical value of the wind ratio progressively increases throughout the winding operation; and in increasing the spindle speed at the point 56, 57, 58, referred to above, the numerical value of the wind ratio will be sharply increased at these points.

Care must be taken that in avoiding one region of patterning, the spindle speed programme is not such that the spindle speed increase ends in another zone of enhanced patterning, associated with a wind ratio which is either a small integer or a ratio of small integers.

The period taken to traverse any zone of enhanced patterning should be as short as possible. Thus at the predetermined points, for example, indicated at 56, 57, 58, the spindle speed programme should intersect the wind ratio curves 52, 53, 54, at an angle approaching a right angle.

The magnitude of the requisite spindle speed increase in order to traverse one of these patterning zones will vary with different wind ratios, but generally will be less than 20% of the mean value of the spindle speed at this point, although such an increase may cause an excessive increase in the balloon tension of the yarn. Hence, it may be desirable to accommodate a certain amount of patterning at certain points in the winding operation, so as to avoid unacceptable adverse effects due to other causes resulting from a large, relatively sudden increase in spindle speed.

The most enhanced patterning occurs when the wind ratio is a small integer, the most severe period corresponding to the wind ratio 1:1. With wind ratios comprising ratios of small integers, the patterning generally will not be as intense, nor as densely distributed over the package surface.

Such a sudden alteration in the spindle speed during a winding programme will have no marked adverse effects on the fabric into which the yarn so-wound is made up, as the consequent increase in yarn winding-on tension is acceptable in that the physical properties of the yarn are not appreciably affected by such a sudden change in the winding conditions. A change in the spindle speed of say, 20% may cause the balloon tension to alter by about 40%.

It will be appreciated that without making provision in the spindle speed programme to ensure that the balloon tension is maintained at a substantially constant value throughout the winding of each package, in the manner described above, the value of the balloon tension may vary over a wide range during the winding of such a package, for example, if the spindle speed is kept at a constant value, the balloon tension may change by as much as 250%.

In the over-end winding of conically-ended package, the wind ratios corresponding to the most enhanced periods of patterning of the package surface, in approximate order of severity of patterning are as follows:

1:1, 2:1, 3:1, 1:2, 3:2 and 5:2; 1:3; 2:3; 4:3; 5:3; 7:3 and 8:3.

In order to reduce the patterning to negligible proportions, all the patterning corresponding to the wind ratios listed above should be eliminated, or substantially reduced, and possibly also the patterning corresponding to the wind ratios which are multiples of 1:4 up to 11:4. The wind ratios which are multiples of 1:5, 1:6, etc. are of relatively minor importance and may be ignored, although clearly a further improved package would be obtained by the elimination of, or the reduction in the extent of, some, or all, of these wind ratios.

It is necessary to make a small correction to the equation $S=T+W$, given above, if strict accuracy is to be observed. Firstly, account must be taken of any yarn retraction on the package after it has been wound, if this yarn is of synthetic polymeric material which is subject to this effect.

Such retraction of the yarn causes the package as a whole to retract, and so relevant changes in package diameter will occur.

In addition, in conically-ended packages in which the yarn lay is in the form of closely-wound helical turns having superimposed thereon a sinusoidal motion, account must be taken of this sinusoidal component of the winding motion in predetermining the values of the package diameters at which enhanced patterning is to be expected.

In this way an error of approximately 4% in the calculated value for the package diameter may occur.

Conveniently the profile of the cam 36 is adjustable (or conforms to that of an adjustable cam), so that the desired spindle speed programme may be determined initially in an empirical manner.

The basic profile of such an adjustable cam would be such that the speed of the spindle of the winding apparatus is reduced during the winding of a package, except where knuckles are displaceably attached to the surface of the cam, the spindle speed being increased when the cam-follower engages these knuckles. The cam should be profiled so that at a position mid-way between adjacent knuckles the spindle speed is such that the desired balloon tension is maintained in the yarn, while at the position immediately before the engagement of a knuckle the spindle speed is, say, 10% below the value required in order to give this desired balloon tension at that position.

These knuckle positions coincide with the points in the winding operation when the most enhanced patterning of the package surface occurs.

The effect of each knuckle is to cause the spindle speed to rise rapidly, from this value below, to the same value above the spindle speed required to maintain this desired balloon tension. The spindle speed is then arranged to fall gradually before engaging the next knuckle, to a value corresponding to a balloon tension 10% below the predetermined value at the point corresponding to this next successive knuckle.

The positions of the knuckles are determined during the initial setting-up of the apparatus.

As stated above, knuckle positions can best be determined empirically, rather than by determining the absolute values for the traveller speed or winding-on speed, or even by a determination of the relevant package diameters, a knuckle being secured to the cam profile where patterning is observed during the previous production of a yarn package.

It may not be necessary for the spindle speed to be increased by as much as 20% at the patterning points so so to reduce effectively the extent of the patterning, although a spindle speed change as low as 6% may prove to be satisfactory, in the case of the patterning conditions associated with certain of the points defined above. Thus knuckles of various heights are used, the height of each knuckle corresponding to the spindle speed change required at that point in the winding operation.

Instead of the variable-pitch pulley and cam arrangement described above, other forms of programming means, for example, electrical or electronic devices may be employed, for example, by having a main motor for the draw rolls etc. and a separate motor for the spindle, the programming means being associated with this latter motor, so as to control the spindle speed in the desired manner. However in each form, when patterning is encountered, the spindle speed is arranged to be increased so that the patterning condition is passed through quickly and, hence, its effect either to be reduced or eliminated.

A modification of the winding apparatus of the draw twist machine described above includes a different form of device for controlling the spindle speed in accordance with the programme embodied in the cam 36 of FIG. 3. This control device 60 is electrical in form and is illustrated in FIG. 6, and will now be described, those parts which are identical to corresponding parts described above being given the same reference numerals, and will not be referred to again except where necessary for an understanding of the manner of operation of this modification.

In this arrangement the spindle 12 is driven by a synchronous D.C. motor (not shown), individually of the main means which drives the draw rolls and feed rolls of the draw twist machine.

The current supplied to the D.C. motor is controlled by a reference voltage from a linear potentiometer 61, the slider 62 of which is rigidly secured to the cam follower 63 of the programming cam *36* [35]. Thus, the spindle speed is varied as in the previously described embodiment, the value of the spindle speed being determined by the position of the slider 62 of the potentiometer 61 the output of which is connected to the D.C. motor by a lead 64.

Conveniently the reference voltage from the potentiometer 61 is compared with that obtained from a tacho-generator connected to the output shaft of the D.C. motor. The error signal obtained by this comparison is then used to alter the setting of the D.C. motor.

Trimming rotary potentiometers (not shown) may be provided at either end of the linear potentiometer 61, each having a range of approximately 20% of the linear potentiometer range, and are used to control the range of the linear potentiometer.

This control arrangement for the winding apparatus is of particular application where it is required to control also the start-up and slow-down performance of the drawtwist machine, during the production of each yarn package, in order to reduce yarn breakages, which are more likely to occur at these points in the winding of a package, than intermediate therebetween.

Thus an electrical timer may be included in the apparatus so that the draw rolls are not operably connected to the drive means until say, 4 seconds, after the spindle has been so connected.

A second timer which controls the slow-down performance of the draw twist machine may also be provided. In such an arrangement a tacho-generator monitors the speed of the main drive means motor, and feeds back a signal to the D.C. motor to drive it against brake pressure acting on the spindle during the slow down of the machine. Thus both motors slow down with speeds which are a predetermined ratio of each other, the draw-rolls slowing down freely and the timing of the application of the brake to the spindle is controlled so as to maintain a traveller speed of at least 2,000 r.p.m.

A cheese winding arrangement according to the present invention is shown in FIG. 7. This arrangement comprises a synchronous electric motor 70 the output shaft 71 of which drives a spindle 72 on which the cheese 73 is being formed, the cheese container 74 being clamped to the spindle 72 in any convenient way.

Conventional traverse yarn guide means, indicated generally at 75, comprises a reciprocating yarn guide 76 in the form of an open-ended notch, and is driven by a second synchronous electric motor 77, via a variable pitch pulley arrangement, shown at 78, the transverse guide speed being varied in accordance with the profile of a control cam (not shown).

The yarn is delivered to the yarn guide at a constant speed from a feeding device (not shown) and hence the speed of the output shaft 71 of the motor 70, and the rotational speed of the package 73 is arranged to be continuously reduced throughout the winding of each package, as the cheese diameter increases. To arrange that the winding-on speed of the yarn is identical to the yarn delivery speed, and there is no build up of tension within the yarn, a conventional sensing head 80 is positioned in the yarn path, the output of which head controls the output of the motor 70 via a known form of servo-device, indicated diagrammatically at 81.

The appearance, and manner of formation of ridging on cheeses, is indicated in FIG. 8a, which shows in an exaggerated way the lay of the yarn on a cheese. For the sake of clarity, the angle of lay of the yarn ($\theta$) has been increased, the value of this angle, normally being of the order of 1°. As illustrated in FIG. 8b this angle is also equal to the "helix angle" as defined herein, ridging being pronounced on cheeses at certain package diameters throughout the winding operation when this angle is in excess of 1°, but will not be so enhanced when the "helix angle" ($\theta$) is about, say, $\frac{1}{10}$°.

In FIG. 8a the lay of the yarn on the cheese when the wind ratio is, say, 2:1 is shown, this being when the traverse yarn guide executes one oscillation along the spindle axis per two spindle revolutions and "synchronisation" of the winding occurs.

Under such winding conditions the yarn of one layer is laid on top of yarn laid in the layers immediately previously, and a ridge of yarn is formed along the whole length of each layer.

However the yarn will not be so laid, in the form of ridges, when the speed of the traverse yarn guide is varied, or the package diameter alters so that the wind ratio become 1.995:1 or 2.005:1.

Care must be taken to ensure that a wind ratio corresponding to a period of enhanched ridging does not occur near to the outside of a completed cheese, or that the decrease in traverse guide speed included in the winding programme, is not such that the one period of enhanced ridging is avoided but another period is entered immediately afterwards.

It will be appreciated that, whereas for over-end winding of conically-ended packages any change in the traveller speed will substantially affect the winding condition, such that it is desirable that the traveller speed should be increased rather than decreased during the winding operation, with cheese winding the winding conditions are less sensitive to changes in the traverse yarn guide speed, and consequently this speed conveniently may be decreased or increased during the winding operation.

As in the case of over-end winding, a reduction in the yarn traverse guide speed will imply that the pattenrning zone occurs at relatively larger package diameters than if this speed is increased. Consequently, by decreasing the yarn traverse guide speed it may be possible to avoid the patterning regions in a cheese of a predetermined size.

However, if the period of patterning is traversed by increasing the traverse guide speed, then this period will have to be traversed again at a larger package diameter, by decreasing the traverse guide speed, so no advantage is gained.

The wind ratios corresponding to a period of enhanced ridging, and normally encountered in the winding of cheeses are the integers 2:1 up to 8:1 and the ratios of small integers in between these values.

Again, the determination of the points in the cheese winding operation at which ridging occurs, is best done in an empirical manner.

When the relevant diameters have been determined, the method of programming the winding apparatus will be identical to that described above with reference to the formation of conically-ended packages by over-end winding. The cam embodying such a cheese winding programme will resemble the cam 36 illustrated in FIG. 3.

Winding apparatus according to the present invention, including means for increasing the spindle speed at predetermined points during the winding operation of each package, may include also means for scrambling the spindle speed, which means also will tend to eliminate ridging or patterning.

Account may have to be taken, in this respect, according to whether the yarn being wound is either a monofilament or a multifilament yarn.

In each illustrated arrangement[s], the increase in the speed of the spindle (or the yarn traverse guide device) will be relatively fast compared to the overall time required to wind each package, for example, a spindle speed increase of, say, 1000 r.p.m. being made in less than 0.5% of the package winding cycle, say, in 7.5 seconds.

It is essential that at the time in the winding operation at which the increase in spindle speed (or traverse guide speed) is initiated by the programming means, that it is within 1% of the predetermined programme for the winding apparatus.

In each embodiment described above, the accuracy with which the programme embodied in the cam is reproduced by the winding apparatus, is mainly dependent upon the accuracy of the motor controlled by the cam, and this will normally be of the order of ±½%.

What we claim is:

1. Apparatus for producing a "cylindrically-wound" yarn package on a spindle, in which package the yarn is laid with a helix angle in excess of one degree, there being predetermined points during the formation of such a package associated with periods during which the yarn turns merge together to form ridges, each period of enhanced ridging corresponding to winding conditions having associated therewith a "wind ratio" the numerical value of which is either a smaller integer or a ratio of small integers, including programming means having a profiled cam which makes one revolution between the winding of successive packages and embodies the desired spindle speed program whereby the winding conditions are controlled and caused to produce an increase in the numerical value of the wind ratio at predetermined points in the winding operation so as to reduce the extent of the periods of enhanced ridging in the formation of the package.

2. Apparatus having over-end winding guide means, and for producing a "conically-ended" yarn package on a spindle, in which package the yarn is laid with a helix angle in excess of one degree, there being pre-determined points during the formation of such a package associated with periods during which the yarn turns merge together to form a surface relief pattern effect, each period of enhanced patterning corresponding to winding conditions having associated therewith a "wind ratio" the numerical value of which is either a small integer or a ratio of small integers, which includes programming means having a profiled cam which makes one revolution between the winding of successive packages and embodies the desired spindle speed program whereby the winding conditions are controlled and caused to produce an increase in the spindle speed at the pre-determined points in the winding operation, so as to reduce the extent of the periods of enhanced patterning in the formation of the package.

3. Apparatus as claimed in claim 2 in which the programming means comprises an electrical device, and includes a potentiometer, the position of the slider of this potentiometer being controlled by the cam, and the output signal from the programming means controlling the spindle speed.

4. Apparatus for producing a cheese on a spindle, and including a reciprocating yarn traverse guide, the rotational speed of the spindle being arranged to be proportional to the ratio of the yarn delivery speed to the package diameter, and the speed of the traverse yarn guide being variable independently of the spindle speed at will, and in which cheese the yarn is laid with a helix angle in excess of one degree, there being pre-determined points during the formation of such a cheese associated with periods during which the yarn turns merge together to form ridges, each period of enhanced ridging corresponding to winding conditions having associated therewith a "wind ratio" the numerical value of which is either a small integer or a ratio of small integers, which includes programming means having a profiled cam which makes one revolution between the winding of successive packages and embodies the desired spindle speed program whereby the winding conditions are controlled and caused to produce an increase in the numerical value of the wind ratio at pre-determined points in the winding operation, and thereby reduce the extent of the periods of enhanced ridging in the formation of the package.

5. A method of producing a "cylindrically wound" yarn package on a spindle, in which package the yarn is laid with a helix angle in excess of one degree, there being predetermined points during the formation of such a package associated with periods during which the yarn turns merge together to form ridges, each period of enhanced ridging corresponding to winding conditions having associated therewith a "wind ratio" the numerical value of which is either a small integer or a ratio of small integers, which comprises controlling the winding conditions to cause an increase in the numerical value of the wind ratio at the predetermined points in the winding operation, so as to reduce the extent of the periods of enhanced ridging in the formation of the package.

6. A method of producing a "conically-ended" yarn package on a spindle, in which package the yarn is laid with a helix angle in excess of one degree, there being predetermined points during the formation of such a package associated with periods during which the yarn turns merge together to form a surface relief pattern effect, each period of enhanced patterning corresponding to winding conditions having associated therewith a "wind ratio" the numerical value of which is either a small integer or a ratio of small integers, which comprises controlling the speed of the spindle to cause an increase in the spindle speed at the predetermined points in the winding operation, so as to reduce the extent of the periods of enhanced patterning in the formation of the package.

7. A method as claimed in claim 6 in which the spindle speed is arranged to be reduced intermediate between the predetermined points.

8. A method as claimed in claim 6 in which the increase in spindle speed at each predetermined point is arranged to be less than 20% of the mean value of the spindle speed at that point in the winding operation.

9. A method as claimed in claim 6 in which the increase in spindle speed at each predetermined point, and embodied in the spindle speed program, is arranged to be the minimum requisite value in order to avoid patterning at that point in the winding operation, the value of this increase varying between different predetermined points.

10. A method as claimed in claim 6 in which the requisite increase in spindle speed at each predetermined point in the winding operation is arranged to be effected during a period less than 0.5% of the package winding period.

11 A method of producing cheeses on a spindle, in which the rotational speed of the spindle is arranged to be proportional to the ratio of the yarn delivery speed to the package diameter, and the speed of a reciprocating traverse yarn guide is arranged to be independently variable of the spindle speed at will, and in which cheese the yarn is laid with a helix angle in excess of one degree, there being predetermined points during the formation of such a cheese associated with periods during which the yarn turns merge together to form ridges, each periods of enhanced ridging corresponding to winding conditions having associated therewith a "wind ratio" the numerical value of which is either a small integer or a ratio of small integers, comprises controlling the speed of the traverse yarn guide to cause an increase in this speed at the predetermined points in the winding operation, so as to reduce the extent of the periods of enhanced ridging in the formation of the package.

*12. A method for winding textile yarn onto a container carried by a rotating spindle by means of a ring and traveller device which comprises tilting the axis of the ring and traveller device relative to the axis of the spindle to enable the winding of said yarn onto said spindle at a relatively high helix angle and then winding said yarn at a relatively high helix angle onto said spindle in the form of closely yound helical turns while maintaining a substantially constant traveller speed and gradually decreasing spnidle speed throughout the building of the package, to thereby produce a stabilized yarn package.*

*13 The process of claim 12 wherein polyamide continuous filament yarn is wound onto said container.*

*14. The process of claim 12 wherein a conically-ended yarn package is produced.*

*15. The process of claim 12 wherein said helix angle is in excess of 1 degree.*

*16. The process of claim 12 wherein said helix angle is in excess of 3 degrees.*

*17. The process of claim 12 including the additional step of controlling in a predetermined manner the tension on the yarn during the building of the package.*

*18. The process of claim 17 wherein the tension on the yarn is gradually decreased during the building of the package.*

*19. A method for winding textile yarn onto a container carried by a rotating spindle by means of a ring and traveller device in which said yarn is laid with a helix angle in excess of 1 degree onto said container in the form of closely wound helical turns while maintaining a substantially constant traveller speed and gradually decreasing spindle speed throughout the building of the package, to thereby produce a stabilized yarn package.*

References Cited

The following references, cited by the Examiner, are of record in the patented file of this patent or the original patent.

UNITED STATES PATENTS

| | | | |
|---|---|---|---|
| 2,529,559 | 11/1950 | Kreamer | 242—26.1 UX |
| 2,764,363 | 9/1956 | Stammwitz | 242—26.3 |
| 3,009,308 | 11/1961 | Bromley et al. | 57—55.5 |
| 3,130,930 | 4/1964 | Miller | 242—26.3 |
| 3,137,987 | 6/1964 | Potts | 57—55.5 |
| 3,334,828 | 8/1967 | Harrison | 242—26.1 |

JOHN PETRAKES, Primary Examiner

U.S. Cl. X.R.

57—55.5, 75, 99, 157 R; 242—18.1, 26.1, 26.2, 26.4

SINGLE FLIGHT AUGERS

Original Filed Nov. 2, 1966

INVENTOR
John V. Watson
BY
Wofford & Felsman
ATTORNEY